(12) United States Patent
Torrey et al.

(10) Patent No.: US 6,675,260 B2
(45) Date of Patent: Jan. 6, 2004

(54) VIRTUAL ELECTRONIC DATA LIBRARY SUPPORTING MIXED DRIVE TYPES USING VIRTUAL LIBRARIES WITHIN A SINGLE LIBRARY

(75) Inventors: William W. Torrey, Greeley, CO (US); Colette T. Howe, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1 day.

(21) Appl. No.: 09/997,385

(22) Filed: Oct. 31, 2001

(65) Prior Publication Data

US 2003/0084240 A1 May 1, 2003

(51) Int. Cl.[7] .............................................. G06F 13/00
(52) U.S. Cl. ........................... 711/114; 711/161; 710/8; 707/204
(58) Field of Search ................................ 711/114, 161; 710/8; 707/204

(56) References Cited

U.S. PATENT DOCUMENTS

| | | | | |
|---|---|---|---|---|
| 5,164,909 A | * | 11/1992 | Leonhardt et al. | 700/215 |
| 5,416,914 A | * | 5/1995 | Korngiebel et al. | 711/114 |
| 5,805,864 A | * | 9/1998 | Carlson et al. | 703/24 |
| 5,867,736 A | | 2/1999 | Jantz | |
| 5,890,014 A | | 3/1999 | Long | |
| 5,970,030 A | * | 10/1999 | Dimitri et al. | 369/30.46 |
| 6,038,490 A | * | 3/2000 | Dimitri et al. | 700/214 |
| 6,044,442 A | * | 3/2000 | Jesionowski | 711/153 |
| 6,085,123 A | * | 7/2000 | Baca et al. | 700/214 |
| 6,295,578 B1 | | 9/2001 | Dimitroff et al. | |
| 6,336,172 B1 | * | 1/2002 | Day et al. | 711/161 |
| 6,421,711 B1 | | 7/2002 | Blumenau et al. | |
| 6,425,059 B1 | | 7/2002 | Basham et al. | |
| 6,507,896 B2 | | 1/2003 | Sanada et al. | |
| 6,519,678 B1 | * | 2/2003 | Basham et al. | 711/112 |
| 6,535,964 B2 | | 3/2003 | Sanada et al. | |

FOREIGN PATENT DOCUMENTS

| | | |
|---|---|---|
| EP | 0859308 | 8/1998 |
| EP | 1156408 | 11/2001 |
| JP | 09185465 | 7/1997 |
| JP | 10269026 | 9/1998 |
| JP | 2001014257 | 1/2001 |

OTHER PUBLICATIONS

The RAID book, by Paul Massiglila and the RAID Advisory Board, 1997, chapters 1–3.*
IBM Technical Disclosure Bulletin, vol. 38, No. 12, Dec. 1995—pp. 243–246.
IBM Technical Disclosure Bulletin, vol. 35, No. 5, Oct. 1992—pp. 17–20.
"Sharing Backup Resources," Ralph Cuellar; Apr. 2000.
"The Gator Tape Library Family Architecture," John Kranz; Oct. 1999.
"Fibre Channel Fundamentals," Tom Weimer.
"Spectra 12000 User Guide," Sep. 2000.

* cited by examiner

Primary Examiner—Reba I. Elmore

(57) ABSTRACT

A virtual electronic data library system has a plurality of storage elements. Each storage element is adapted to store a medium of a plurality of media. Preferably, a plurality of subsets of the media each have one format of a plurality of formats. A plurality of input/output elements are preferably adapted to receive and read the media stored in the storage elements. Each of the input/output elements is capable of operatively receiving media having at least one of the formats. A library controller has firmware wherein the subsets of the media are each assigned a logical unit number for use by the controller to partition the library. At least one transport is operable to remove the media from the storage elements and operatively deploy the media for use by one of the input/output elements. The transport deploys the media in an input/output element according to the logical unit numbers.

18 Claims, 3 Drawing Sheets

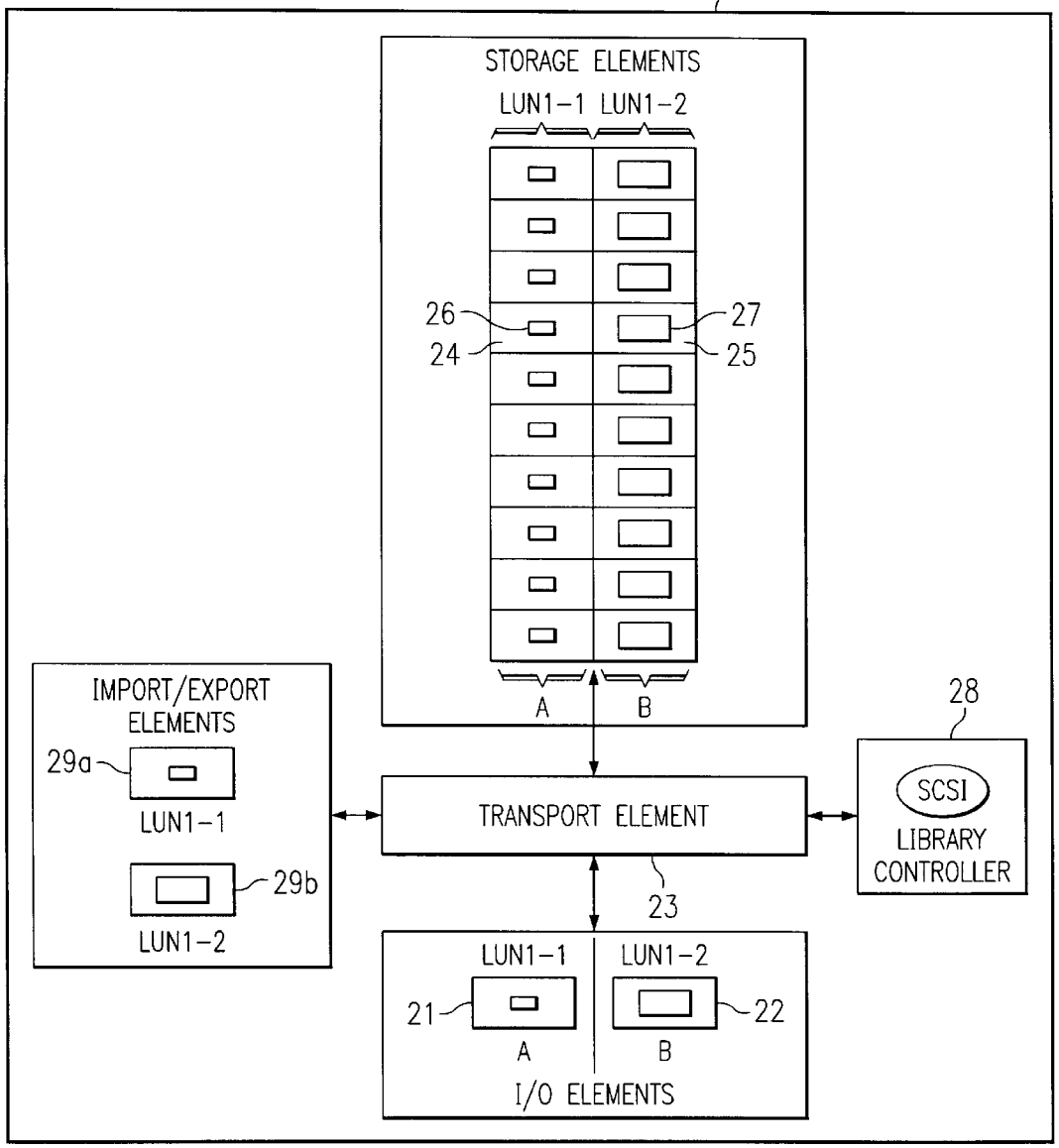

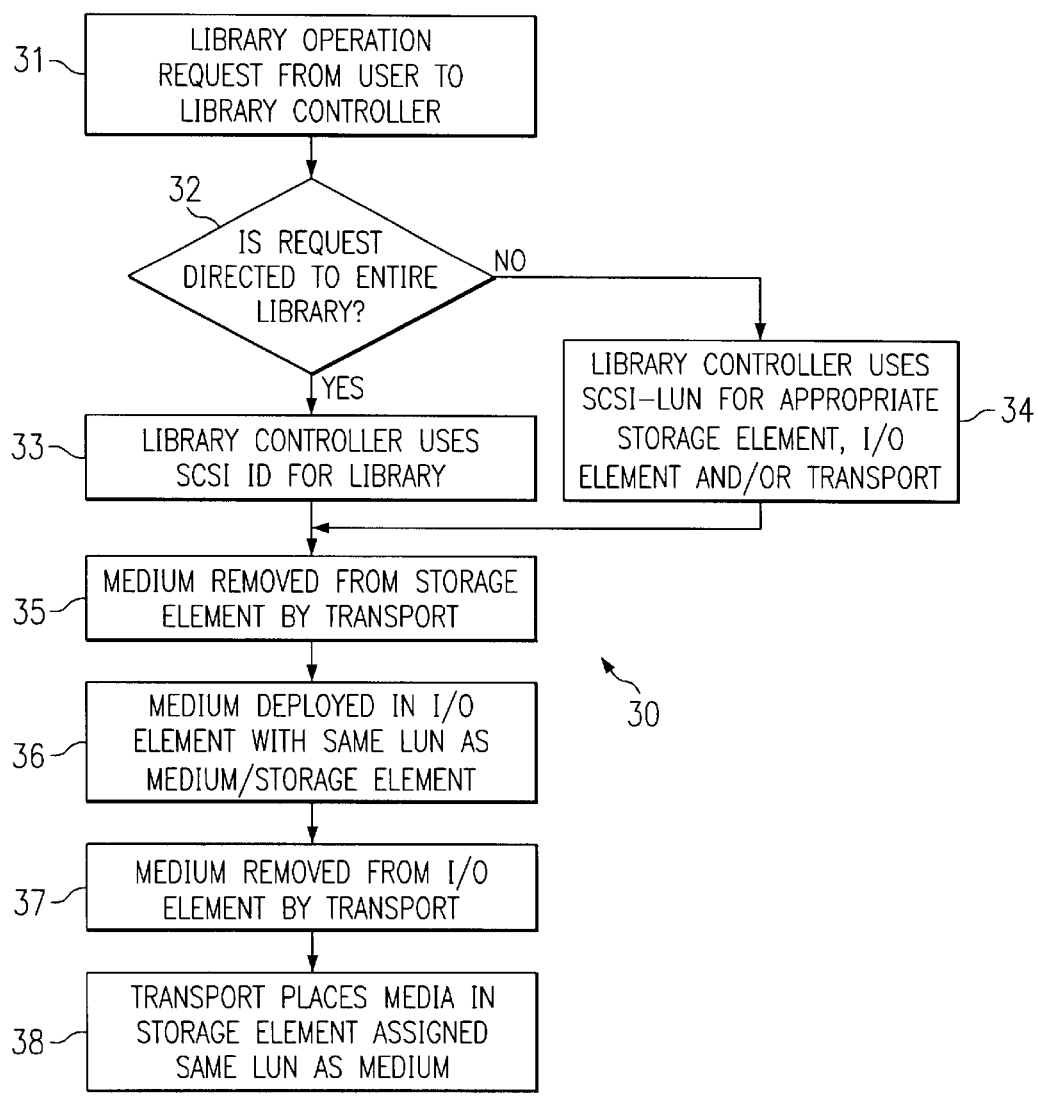

VIRTUAL ELECTRONIC DATA LIBRARY SUPPORTING MIXED DRIVE TYPES USING VIRTUAL LIBRARIES WITHIN A SINGLE LIBRARY

TECHNICAL FIELD

The present invention relates to electronic data storage and more specifically to a virtual electronic data library that supports mixed drive types using virtual libraries within a single library.

BACKGROUND

Existing data libraries typically employ a single drive type and one specific media format associated with the drive type. Generally, a data library is made up of a set of storage elements or slots housing tapes, disks or other media of a single type and format; one or more data input/output (I/O) elements of a single type and format, such as tape, disk or magneto-optical drives; and at least one transport for removing the media from the slots and inserting the media into the I/O elements. The transport generally takes the form of a robotic device that physically removes a medium from a slot, transports the medium to a drive element, and physically installs the medium in the drive. In larger libraries there may be more than one transport. Existing libraries generally have more than one tape drive, but all the drives and tapes are of the same type and format.

Generally, a controller card in the library system, such as may use a small computer systems interface (SCSI) standard, directs operations employing the different elements in the library. SCSI is an industry standard general-purpose parallel interface designed for providing high speed connections between one or more computers and one or more peripherals. Depending on the SCSI standard, a total of four, eight, or sixteen devices may be connected to one bus. A great advantage of SCSI is the ability to chain together multiple devices on a single physical I/O interface with each device having a unique address. SCSI is an interface system that is focused on a host adapter. The host adapter provides a shared bus that attached peripherals use to pass data to and from the host system. Theoretically, any SCSI device may be attached to any SCSI controller. The original SCSI standards supported four to eight devices on a single host adapter, but newer standards support high-speed operation of up to sixteen devices and bus lengths of up to twenty-five meters. Many SCSI devices have their own control circuitry. Such devices may carry out assigned tasks without direct control, freeing up the bus for other functions.

An existing method of extending the SCSI architecture employs a logical unit number (LUN) architecture. LUNs are assigned to SCSI devices deployed under the control of a primary SCSI device. Previously this has facilitated control of multiple devices, greater than the aforementioned limits, that are not connected directly to the SCSI bus. Thus, multiple devices under one SCSI device may be accessed through LUNs. However, since the SCSI bus has been widened from 8 to 16 devices, there has not been much need for such an extension. With overall performance targets in mind, the number of devices on the same SCSI bus has necessarily been minimized. Existing data libraries do not make use of LUNs.

Advances in drive and media technology have encouraged migration to different drive types for library uses. Since existing libraries employ only one drive type, such a migration in a existing data library system requires purchase of an entire new data library, or format conversion of the existing library. A media and/or drive upgrade may be desirable or necessary to accommodate higher density media, higher transfer rates, different media suppliers or be necessary due to a purchase of data, assets or an entire enterprise. Unfortunately, older media oftentimes will not function in newer drives. Additionally, to partition an existing library or to break a library into virtual libraries, special software has typically been required.

SUMMARY OF THE INVENTION

A virtual electronic data library system has a plurality of storage elements. Each of the storage elements is adapted to store a medium of a plurality of media. Preferably, a plurality of subsets of the media each have one format of a plurality of formats. A plurality of input/output elements are preferably adapted to receive and read the media stored in the storage elements. Each of the input/output elements is preferably capable of operatively receiving media having at least one of the formats. At least one transport is preferably adapted to remove the media from the storage elements and provide the media to the input/output elements. A library controller preferably has firmware wherein the subsets of the media are each assigned a logical unit number for use by the controller to partition the library. Preferably, at least one transport is operable to remove the media from the storage elements and operatively deploy the media for use by one of the input/output elements. The transport deploys the media to input/output elements according to the aforementioned logical unit numbers.

Another embodiment of an electronic data library system has a plurality of storage elements. Each of the storage elements is adapted to store a medium of a plurality of media having a plurality of formats, each of the formats having a logical unit number. At least one transport is operable to remove the media from the storage elements and operatively deploy the media for use by one of at least one input/output elements. At least one transport deploys the media in at least one input/output elements according to the logical unit number. A library controller directs at least one transport to deploy the media in at least one input/output elements according to the logical unit number.

BRIEF DESCRIPTION OF THE DRAWING

FIG. 2 shows a diagrammatic representation of an electronic data library having two media and drive types employing the present inventive system; and FIG. 3 is a flow chart illustrating operation of a data library in accordance with the present inventive method.

DETAILED DESCRIPTION

Figure 1:
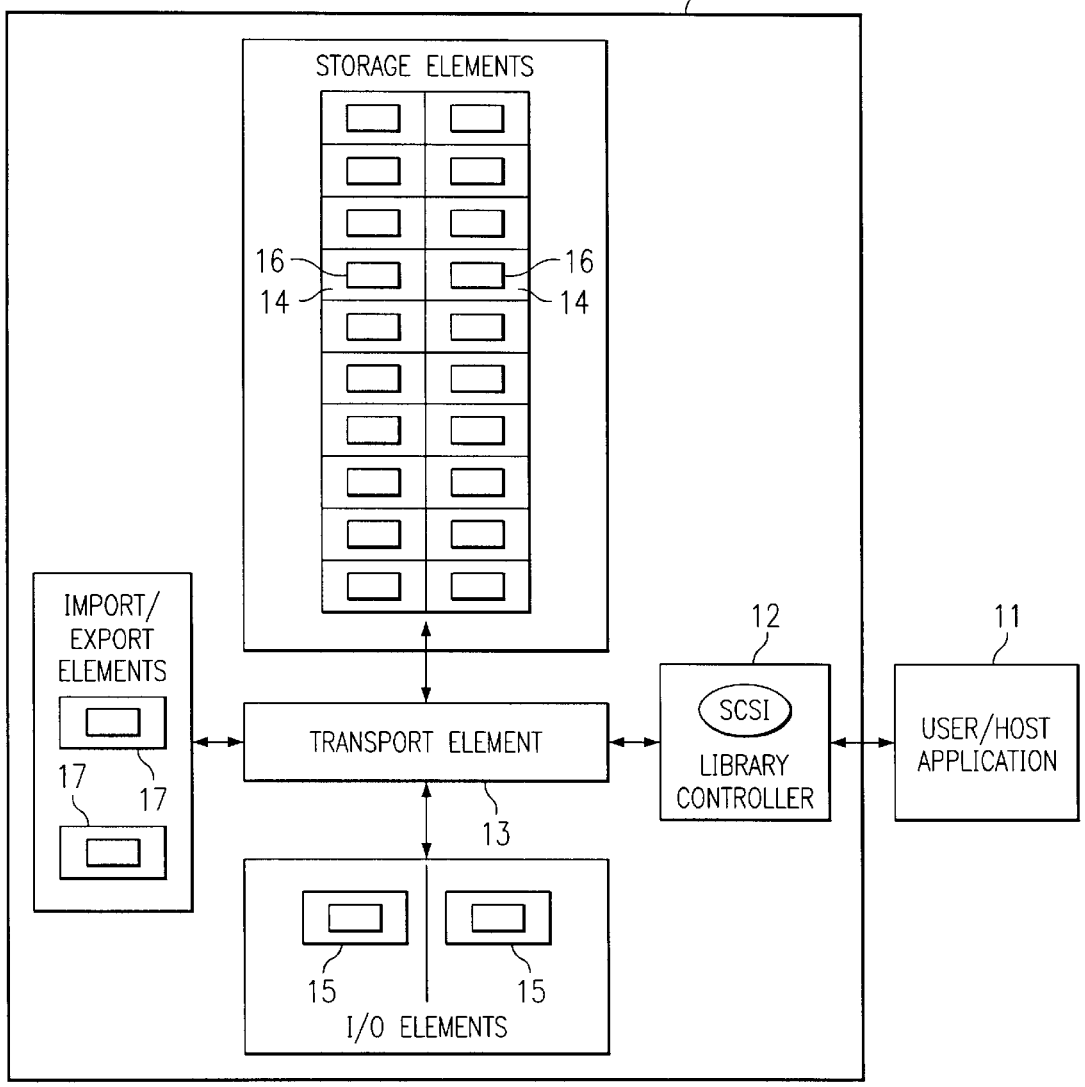
FIG. 1 shows a diagrammatic representation of deployment of a typical existing electronic data library capable of employing the present inventive system.

The present invention is directed to a system and method to support mixed drive types using virtual libraries within a single data library. Proliferation of drive types, with many associated advantages and improvements, creates a need for making drive types work together to provide a unitary library. Hence, it is desirable to allow a user to upgrade to newer archiving or I/O equipment without converting a library of existing data or archives to a new format and media. Additionally, it is desirable to provide a single library that will support more than one type of drive and/or media format and/or type, such as to provide backwards compatibility. Finally, it is desirable to offer a partitioning mechanism within the library itself to facilitate partitioning, particularly to facilitate the use of mixed drive types.

An embodiment of the present inventive system and method allows host software applications to access one or more different drive types and/or formats in the same electronic data library using a logical addressing system such as small computer systems interface (SCSI) logical unit numbers (LUNs). The present invention preferably facilitates the use of standard backup software to control a library without the need for special software and promotes use by independent software vendors of a new media format for library purposes. As used hereinafter, "format" and "type", shall interchangeably refer to either a media and drive type or the particular physical and data format used by the media and drive.

Turning to FIG. 1, operation of an existing electronic library 10 is diagrammatically illustrated. A request from user application 11 is carried out by SCSI based library controller 12. Such a request may result in transport 13 being directed to remove a medium 16, such as a particular tape cartridge, from one of storage element slots 14 and insert it into one of I/O elements 15, that is a tape drive or the like. A medium 16 may be inserted into or removed from existing library 10 via import/export element slots 17. As discussed above, both of the drives in existing library 10 correspond to medium 16's type and format and all media in the storage element slots 14 are of this same type and format.

By way of example, as diagrammatically illustrated in FIG. 2, library 20 employing a system and method in accordance with the present invention may have more than one type of drive 21 and 22. By way of example, library 20 may have originally only had type A drive(s) 21; type B drive(s) 22 may have later been added to library 20. The media and drives for the two types of drives may not be compatible or the drives may only be backward compatible. For example, type A media 26 may work in type B drive 22, providing backward compatibility. However, newer media, for example type B media 27, typically will not function in older drives, such as type A drive 21. Preferably, transport mechanism 23 in library 20 should not move type A media 26 to type B medium drive(s) 22 unless such backward compatibility exists. Regardless, type B media 27 should not typically be moved to type A drive(s) 21.

To provide transparency to library accessing software, library system 20 preferably uses a logical addressing system, such as logical unit numbering to address different portions of library 20. Logical unit numbering is an addressing scheme of the SCSI specifications. By way of example, SCSI device ID number 1 could be assigned to entire library 20 and LUN 1-0 could be used for indication of what resources are available overall in library 20, but not necessarily the format or media type of the resources. In the example illustrated in FIG. 2, type A drives 21 may be associated with LUN 1-1 and type B drives 22 may be associated with LUN 1-2. So if the host software needs to utilize a type A element to perform an operation on the library, it would query the library through the element status command, using LUN 1-1, what resources it has available. For example, what slots 24 have been assigned to type A media 26 and what I/O elements 21 may receive type A media 26. Similarly, a host could command insertion of a type B medium 27 housed in slot 25 into type B drive 22, via LUN 1-2.

Preferably, no hardware modifications to slots 24 and 25, media 26 and 27, transport 23 or drives 21 and 22 are required by the present invention. Additionally, it should be appreciated that a library configured according to the present inventive system and method may include multiple media types and formats. To provide the aforementioned transparency the present invention is preferably, at least in part, embodied in the firmware of SCSI library controller 28. The controller firmware defines an ability to address multiple medium types or drive types making up library 20, as a single library, for example as LUN 0. The firmware also allows individual addressing of the media and drive types as LUNs 1, 2, etc. Preferably a host computer employs SCSI commands to interact with SCSI library controller 28 having modified firmware. The library is the target for the host. Controller 28 directs the robotics of transport 23.

In an alternative embodiment, application software running on a host computer would address the library by addressing a specific LUN. This is a relatively straightforward modification compared to re-architecturing software to handle multiple drive types directly. Existing software uses SCSI addresses. A SCSI address is made up of host bus, adapter, port number and SCSI ID and LUN number. Most existing software uses the SCSI ID as a device identifier and does not typically support LUNs.

Alternatively, to provide the aforementioned transparency, a post application program interface (API) may be used to directly interact with device drivers. Most library software applications use device drivers to interface with drives and device drivers for the library itself. An API employed by an embodiment of the present invention may interpret directions from the application software accessing the library. In other words, the device drivers may be changed to re-map device addressing. For instance, SCSI-ID 1 in an application program could be re-mapped to LUN 1-1 by the API, and SCSI-ID 2 could be re-mapped to LUN 1-2. Thereby, the host application software does not necessarily need to be changed, only new remapped drivers installed to support the present invention.

As pointed out above, the preferred embodiment controller card in the library system communicates using a SCSI interface and directs operations employing different elements in the library. Commands are directed to a SCSI address, for example, SCSI LUN 1-0 if the command is to be applied to all the resources in the library. As a further example, if the host application asked for the element status of the library at LUN 1-0, and the library has twenty slots and two drives, it would report how many and which of the twenty slots were available. Likewise, it would report the availability of the transport and the drives. If accessing LUN 1-1, the system would only report and do operations employing elements that are associated with LUN 1-1. For example, if there were 20 slots total in the library but only the first 10 were associated with LUN 1-1, a LUN 1-1 element status would report the status of the first 10 slots, which slots were full and which were available. The status of the import/export elements associated with LUN 1-1 would be reported. The LUN 1-1 element status would also report the status of the drives associated with LUN 1-1 and the status of the library transport or the transport associated with LUN 1-1.

Turning to FIG. 3, a preferred embodiment of the present invention for partitioning a data library employing SCSI LUNs is flow charted as method 30. A request from a user calls for an operation on the library at box 31. At 32 a determination is made whether the request is directed toward the entire library. This determination may be made by the nature of the request, for example a status request or a library content inquiry would typically call for a report on the entire library. If the request is directed toward the entire library, the library controller will use the SCSI ID for the entire library to carry out the request at box 33, without the use of a specific LUN. If a determination is made at 32 that the request is directed to only a portion or specific elements of the library, the library controller uses the SCSI LUN assigned to the storage elements, media and I/O elements involved to carry out the request at box 34. If the library employs more than one transport, LUN(s) corresponding to media types and formats to be handled by each transport may be assigned to the transports as well.

Under the appropriate directions from the controller, the transport removes a medium from the storage elements at box 35. The medium is inserted into the proper I/O element, or otherwise operatively deployed at box 36, according to the LUN assigned to the slot/medium and the I/O element. Once the operation to be carried out by the I/O element with the medium is complete and/or the I/O element is needed for another operation, the medium is removed from the I/O element by the transport at box 37. At box 38, the medium is returned to a storage element corresponding to the LUN assigned to the media type and format.

Typically only one transport is used by a library. Therefore, the transport may be shared across the resources of virtual libraries. In order to share a single transport, the present system preferably holds moves requested for another LUN element when moving or transporting a medium or other medium to or from an I/O element. Additionally, the SCSI standard may be used to direct the library controller to view the different LUN requests as coming from different initiators. In other words, instructions to a single transport serving multiple LUNs could be treated by the transport as multiple users making requests to a single library. Thereby, prioritizing actions based on the order received or other applicable criteria, holding actions for the completion of previous or higher priority instructions.

In existing data libraries, a medium could be moved to the transport and held. However, in the present system, to facilitate sharing, requests to move to the transport would preferably be rejected as an illegal command or the subject media redirected to a holding slot. In this way the transport is always free after a move has been completed. This avoids a host application requesting that a medium be moved to the transport and left there resulting in a second host application, employing a different LUN, not being able to access the transport, because the transport is full. If the first application were allowed to issue a hold command, the second application would not recognize why the transport is full because it did not request that the medium be put in the transport and is unaware of the portion of the library operating under another LUN.

However, larger libraries may have two or more transports. In that case, transports may be dedicated to a particular drive type and thus LUN. A library with different drive types could use a separate transport for each drive type, with slots allocated to only be associated with that transport and drive type. Thus, a transport, set of storage elements and a drive or drives would be assigned a LUN.

An alternative component employed by most library systems is one or more import/export or mail slot elements 29a and 29b, FIG. 2. Mail slots 29a and 29b are used to introduce new media into library 20. If a system using the present invention only employs one mail slot for all media types, the mail slot is preferably shared through the present invention. However, multiple mail slots may be employed by a library using the present invention, one slot being for one media format and another slot being for a second media format, etc. Preferably, the mail slots themselves will not physically allow the wrong media type to be inserted. Thereby, when a tape or other media is introduced through a particular mail slot, the system will preferably recognize in which library element slots the introduced media may be stored for use by the library. Alternatively, a single mail slot or import/export slot is used, and the transport mechanism is enabled to recognize the media. Such recognition may be based on several different criteria. For example, bar code labels or other markings may be employed; cartridge memory (CM) chips housed within a tape cartridge may identify the tape type; and/or, dimensions of a tape cartridge may be indicative of its format.

Some tape formats use the same physical cartridge dimensions and configuration as previous types and/or formats. However, there is generally a physical stop in a drive to prevent loading an older format tape into a newer drive. These tapes appear identical from the exterior. There is no way to differentiate between the cartridges until one attempts to load a cartridge into a drive, and is physically unable to load the cartridge into the drive. However, the present system may be user-configured to set aside or partition the library through a user interface allowing the user to identify tapes as those of a particular type or format and appropriately allocate slots and drives using LUNs.

What is claimed is:

1. A virtual electronic data library system comprising:
   a plurality of storage elements, each of said storage elements adapted to store a medium of a plurality of media, a plurality of subsets of said media each having a different format of a plurality of formats;
   a plurality of input/output elements adapted to receive and read said media stored in said storage elements, each of said input/output elements capable of operatively receiving media having at least one of said plurality of formats; and
   a library controller comprising firmware wherein said subsets of said media are each assigned a logical unit number for use by said controller to partition said library.

2. The system of claim 1 wherein each of said storage elements have a same logical unit number assigned as said medium stored therein.

3. The system of claim 1 wherein each of said input/output elements have one of said plurality of formats, and said logical unit numbers are assigned to said input/output elements according to said plurality of formats.

4. The system of claim 1 wherein said controller is a small computer systems interface controller.

5. The system of claim 1 further comprising:
   at least one transport that is adapted to remove said media from said storage elements and provide said media to said input/output elements assigned a same logical unit number.

6. The system of claim 5 wherein said at least one transport comprises a plurality of transports with at least one transport operable to remove and operatively deploy media assigned each logical unit number.

7. The system of claim 1 wherein a transport recognizes said format of an introduced media and said controller assigns one of said logical unit numbers to said introduced media.

8. An electronic data library system comprising:
   a plurality of storage elements, each of said storage elements adapted to store a medium of a plurality of media having a plurality of formats, each of said formats having a logical unit number;

at least one transport operable to remove said media from said storage elements and operatively deploy said media for use by one of at least one input/output elements, said at least one transport deploying said media in said at least one input/output elements according to said logical unit number; and a library controller directing said at least one transport to deploy said media in said at least one input/output elements according to said logical unit number.

9. The system of claim 8 wherein said at least one input/output elements are operable to receive media stored in said storage elements, each of said at least one input/output elements receiving media having at least one of said formats, each of said at least one input/output elements assigned said logical unit number of said format each of said input/output element receives.

10. The system of claim 8 wherein said controller is a small computer systems interface controller.

11. The system of claim 8 wherein said at least one transport comprises at least one transport operable to remove and operatively deploy media assigned each logical unit number.

12. The system of claim 8 further comprising at least one import/export slot to introduce media into said library and remove media from said library.

13. The system of claim 12 wherein said at least one transport recognizes said format of said introduced media and said controller assigns one of said logical unit numbers to said introduced media.

14. A method for partitioning an electronic data library, said method comprising the steps of:

assigning a different logical unit number to each of a plurality of media formats in said library; and controlling operation of said library according to said logic unit numbers.

15. The method of claim 14 wherein said assigning step comprises:

assigning each subset of media in said library having a same format a logical unit number; and assigning a same logical unit number as one subset to at least one input/output element capable of employing media having a format of said one subset.

16. The method of claim 15 wherein said controlling step further comprises the step of:

transporting a medium from one of said subsets to an input/output element assigned a same logical unit number as said one of said subsets.

17. The method of claim 15 wherein a medium from one of said subsets is housed in one storage element of a plurality of storage elements and said assigning step comprises:

assigning a same logical unit number to said one storage element as said medium housed therein.

18. The method of claim 15 wherein said assigning step comprises:

assigning a same logical unit number to at least one transport associated with said library.

* * * * *